United States Patent [19]
Huang

[11] Patent Number: 5,930,260
[45] Date of Patent: Jul. 27, 1999

[54] ISDN TERMINAL ADAPTER USING DIGITAL SIGNAL PROCESSOR

[75] Inventor: James Huang, San Jose, Calif.

[73] Assignee: InnoMedia Pte, Ltd.

[21] Appl. No.: 08/747,433

[22] Filed: Nov. 18, 1996

[51] Int. Cl.[6] .................................................. H04Q 11/04
[52] U.S. Cl. ........................ 370/420; 370/449; 370/465; 370/524
[58] Field of Search ..................... 370/465, 467, 370/468, 420, 421, 522, 524–526, 466, 449, 346, 463; 379/93.06, 93.05; 340/825.07, 825.08; 395/677; 375/222

[56] References Cited

U.S. PATENT DOCUMENTS

| | | | |
|---|---|---|---|
| 5,305,312 | 4/1994 | Fornek et al. | 379/93.06 |
| 5,455,829 | 10/1995 | Klingberg | 370/524 |
| 5,495,485 | 2/1996 | Hughes-Hartogs | 370/524 |
| 5,598,401 | 1/1997 | Blackwell et al. | 370/385 |
| 5,638,373 | 6/1997 | Takebayashi et al. | 370/524 |
| 5,708,663 | 1/1998 | Wright et al. | 370/524 |

FOREIGN PATENT DOCUMENTS

| | | |
|---|---|---|
| 0353 890 | 2/1990 | European Pat. Off. . |
| 0659 007 | 6/1995 | European Pat. Off. . |
| 0 772 370 | 5/1997 | European Pat. Off. . |
| 44 14 554 | 11/1995 | Germany . |
| WO 98 07292 | 2/1998 | WIPO . |

OTHER PUBLICATIONS

ISDN Instruction Manual: MN128, pp. 1–78, Dated: Jan. 2, 1996. (This document is written in the Japanese language.).
Motorola User's Guide: BitSURFR Pro™ ISDN Modem Terminal Adapter, Published by Motorola on Jul. 1995, pp. i–xii, Chapter 1–12 including Appendix A–E.

*Primary Examiner*—Chau Nguyen
*Attorney, Agent, or Firm*—Graham & James LLP

[57] ABSTRACT

A terminal adapter for ISDN services is implemented using a digital signal processor rather that a general purpose microprocessor, and provides normal terminal adapter functionally while at the same time substantially reducing part count and increasing flexibility and reliability. The terminal adapter uses a pipelined operating system involving a series of hierarchical menus of subtasks to perform the various functions required for ISDN operability.

13 Claims, 4 Drawing Sheets

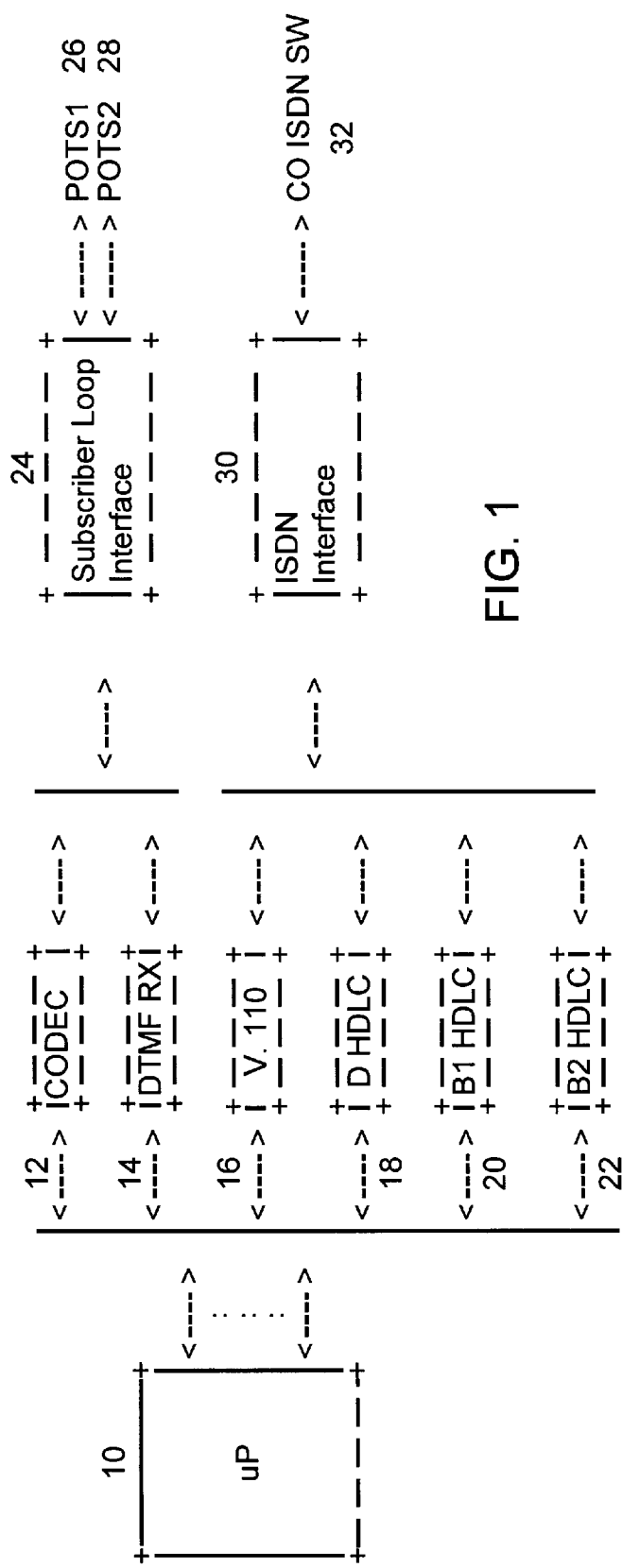
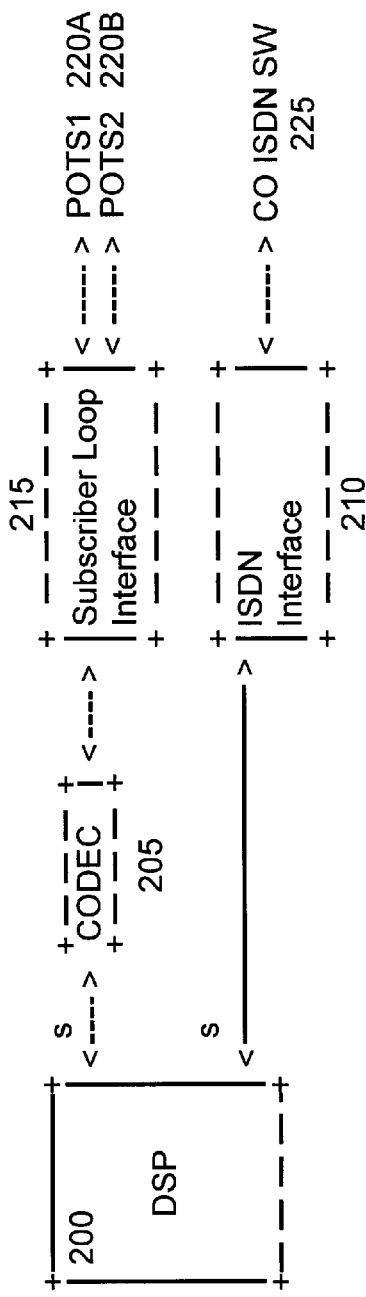
FIG. 1
FIG. 2

ISDN TERMINAL ADAPTER USING DIGITAL SIGNAL PROCESSOR

RELATED APPLICATION

This application incorporates by reference the following applications, both filed on even date herewith and commonly assigned:

U.S. patent application Ser. No. 08/747,432, entitled System and Method for Dynamically Reconfigurable Packet Transmission, Jacek Minko, inventor;

U.S. patent application Ser. No. 08/751,876, entitled Concatenation Compression Method, Jing-Zheng Ouyang and Nan-sheng Lin, inventors.

FIELD OF THE INVENTION

The present invention relates to communications devices, and more particularly relates to terminal adapters usable with the integrated services digital network, or ISDN.

BACKGROUND OF THE INVENTION

Within the last few years, the advantages of the integrated services digital network (ISDN) have become well-known. Among other things, the increased speed of the communications link, as well as the ability to carry on both voice and data communications simultaneously, have offered substantial advantages to the consumer.

To access ISDN services, a terminal adapter is required. A number of manufacturers currently offer such devices, but all such devices to date tend to be substantially more expensive than analog modems. Part of the expense associated with a typical ISDN terminal adapter involves the use of a relatively high performance general purpose microprocessor, together with other logic external to the microprocessor to maintain feature compatibility with the digital network.

A typical prior art terminal adapter is shown in FIG. 1, and includes a general purpose microprocessor 10, such as a Motorola 68302, which communicates bidirectionally with a plurality of external logic devices such as CODEC logic 12, DTMF RX logic 14, V.110 compatibility logic 16, and HDLC logic for the D and dual B channels, identified at 18, 20 and 22. The CODEC logic 12 and DTMF transceiver logic 14 in turn communicate with a subscriber loop interface 24, so that the system may communicate with conventional telephone sets, sometimes referred to herein as POTS1 and POTS2, or "plain old telephone set," and identified at 26 and 28.

The V.110 logic 16 and HDLC logic 18–22 communicate with standard ISDN interface logic 32, which connects to the ISDN network provided by the telephone company.

It will be appreciated that this logic is both complicated and expensive. In addition, in the event of any change in features, a typical prior art device is obsoleted because the design is substantially hardware-based and therefore offers little flexibility for upgrading. There has therefore been a need for a design of ISDN terminal adapter which minimizes costs while offering both full functionality and the flexibility to incorporate new features.

SUMMARY OF THE INVENTION

The present invention overcomes many of the limitations of the prior art by providing a remarkably simplified, lower cost, solution which implements many of the current ISDN terminal adapter functions in firmware. The firmware implementation, in addition to offering a significant hardware cost savings, also provides flexibility for future upgrades.

In particular, the terminal adapter of the present invention basically comprises a low-cost, special purpose digital signal processor, CODEC logic in combination with a subscriber loop interface, and a standard ISDN interface.

The present invention therefore eliminates the general purpose microprocessor of the prior art, as well as most of the compatibility hardware required in such prior art devices. At the same time, the present invention provides full D channel and B1/B2 channel operation.

To achieve functionality with such a design, each of the functions performed by prior art hardware is performed in firmware operating on the DSP. The operation of the system is basically pipelined as a continuous loop, where the particular functions performed by the system are established in response to the sampled data type generated by each cycle.

At a high level, the operation of the system starts with a power-up initialization, and then advances to a polling of the ISDN interface, followed by a polling of the CODEC interface, and finally followed by execution of a low priority task scheduler. Within each of these three major functions are numerous subsidiary functions, not all of which need be executed during every cycle. In a presently preferred embodiment, the task scheduler may be of sufficiently low priority that only one of the available tasks is performed per cycle.

Because the functions are performed in firmware, it is also possible to allow for future expansion, such as by implementation of fax/modem or multimedia features. In addition, modifications are substantially more easily provided to the user, minimizing the risk that the equipment will become obsolete rapidly.

These and other details of the present invention may be better appreciated from the following detailed description of the invention, taken in combination with the accompanying Figures.

THE FIGURES

FIG. 1 shows a prior art design for an ISDN terminal adapter.

FIG. 2 shows in schematic block form the logic of the ISDN terminal adapter of the present invention.

DETAILED DESCRIPTION OF THE INVENTION

Referring first to FIG. 1, a prior art terminal adapter for use with ISDN services is shown. This adapter is discussed in detail in the Background portion, above.

Referring next to FIG. 2, a terminal adapter 150 in accordance with the present invention is shown in block diagram form. A digital signal processor, or DSP 200, is shown communicating bidirectionally with a conventional CODEC 205 and an ISDN Interface 210. The CODEC 205, in turn, communicates with a conventional subscriber loop interface 215, which provides a link to POTS1 (Plain Old Telephone Set) and POTS2, indicated at 220A–B. The ISDN interface 210, in turn, communicates over a channel 225 with the provider of ISDN services, typically a telephone company.

Figure 3:
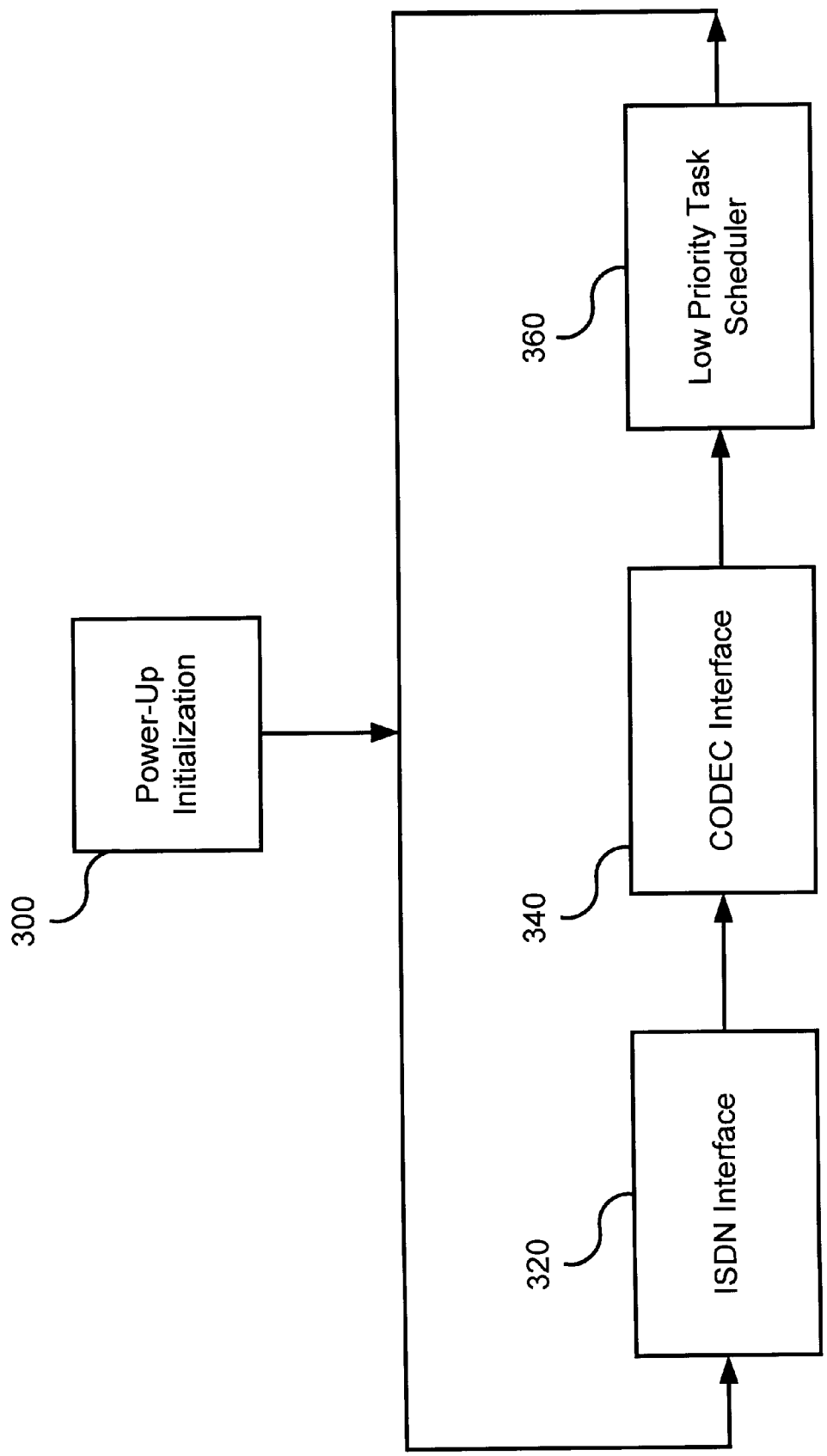
FIG. 3 shows in flow diagram form an overall view of processing performed in accordance with the present invention.

Referring next to FIG. 3, the sequence in which the various functions of the system are performed may be better appreciated. In particular, the process begins at step 300 with a power-up initialization, and then advances to a loop 310 having three high level tasks, each of which may have multiple sub-level tasks. The loop can therefore be seen to be a pipelined operating system.

The first high-level task in the loop 310 is the ISDN Interface, indicated at 320. Following the ISDN Interface task 320 is the CODEC Interface task 340, finally followed by the Low Priority Task Scheduler 360. In an exemplary embodiment, each of the high level tasks 320–360 is subdivided into a plurality of sub-tasks. These sub-tasks are self-sustaining, and allow the operating system to work directly with them so that the DSP 200 can complete as many tasks as possible in real-time. As will be discussed in greater detail hereinafter, each of these sub-tasks may also include one or more further sub-tasks. Within each menu of sub-tasks, the completion of a particular sub-task can execute a call to the next higher level task, which can in turn execute a lower-level subtask without requiring management from still higher levels in the protocol. In this manner substantial performance benefits are gained.

The sub-tasks performed within the high level ISDN Interface task 320 include the physical layer D channel HDLC data transmit and receive, B1 channel HDLC data transmit and receive, B2 channel HDLC data transmit and receive, and V.110 rate adaptation. Depending on the data type involved in each cycle, fewer than all of the above tasks may be executed during that loop.

The sub-tasks performed during the high level CODEC task 340 include various functions to permit the use of conventional analog telephone sets and conventional voice communications. If voice communication is not required for the particular application of the terminal adapter of the present invention, the CODEC interface and POTS connections 220A–B may be eliminated. However, where such voice/telephone communication is desired, the sub-tasks of the CODEC task 340 include POTS1 (voice), POTS2 (voice), POTS1 (DTMF) and POTS2 (DTMF). As with the sub-tasks of the ISDN Interface 320, not all of these tasks are necessarily performed in a particular loop.

Finally, the Low Priority Task Scheduler 360 includes a plurality of low level tasks. In an exemplary embodiment, and unlike the sub-tasks and only one of these low level subtasks is executed during a single cycle.

As noted previously, the sub-tasks described above may further include a plurality of sub-tasks. The operation of such subtasks of may be better appreciated in connection with the following example, taken in conjunction with FIG. 4.

As with other terminal adapters, the terminal adapter of the present invention is connected through the D Channel to a host system of some nature, for example a Pentium®-based PC. When the PC instructs the terminal adapter 150 to transmit a block of D Channel HDLC data 400 to the telephone company central office ISDN Switch 225, the terminal adapter 150 identifies the need to execute the ISDN Interface task 320, shown at step 405. The execution will then jump to the D HDLC task, shown at 410. Further, execution will then jump to a subsidiary subtask "Transmit D HDLC data" indicated at 415, and the data will be transmitted accordingly.

Still further subtasks must also be executed to transmit the HDLC data, including transmitting the interframe idle pattern (as a flag or a mark), as shown at 420, followed by transmitting the first byte of data of the HDLC frame as shown at 425. Thereafter the system transmits, one byte at a time, the remaining bytes of the message, as indicated at 430.

Figure 5:
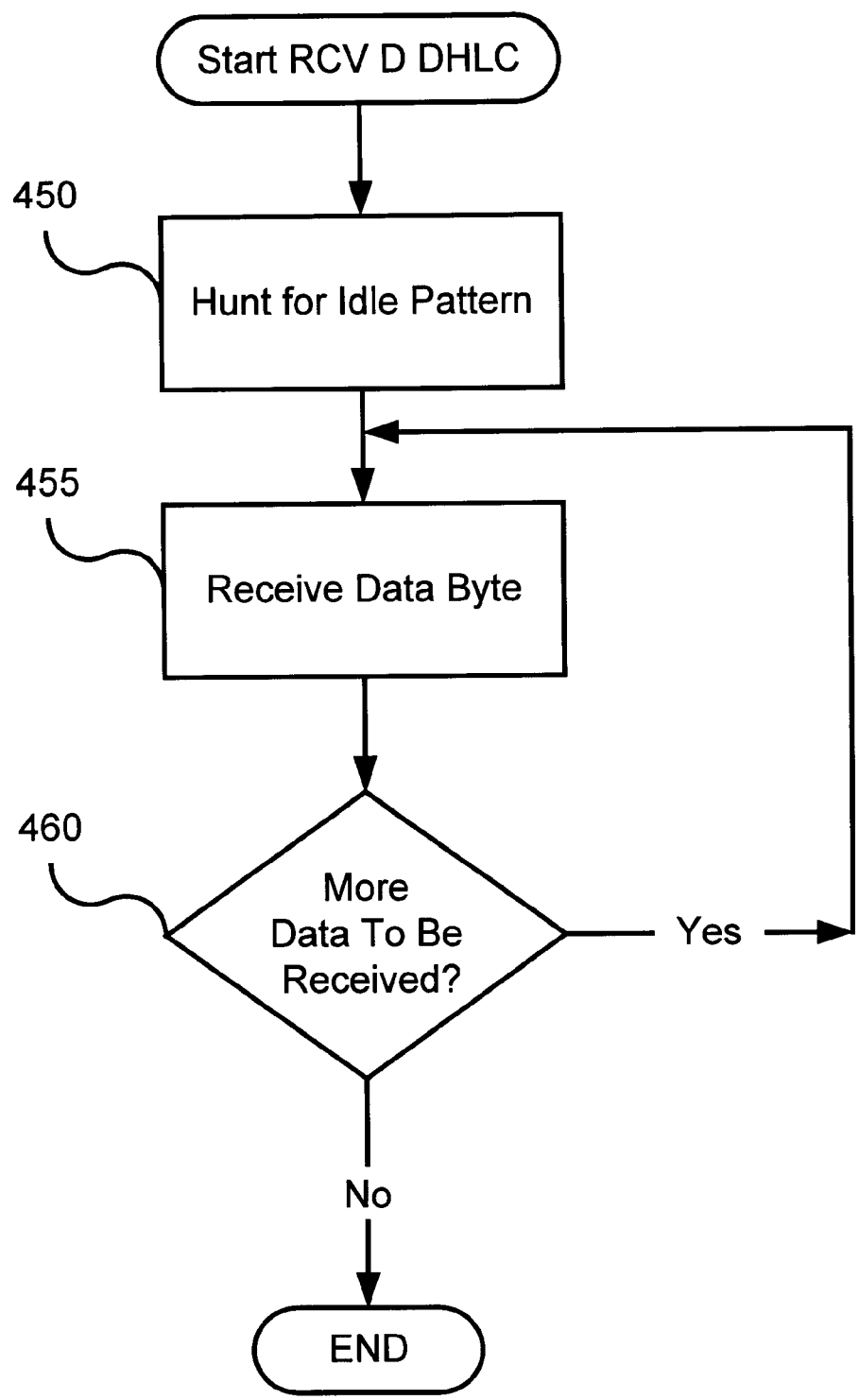
FIG. 5 shows in flow diagram form the execution of the D HDLC receive operation of the present invention.

To receive D HDLC data requires a similar operation, as shown in FIG. 5. The subtasks include hunting for an idle pattern, shown at step 450, followed by receiving the first byte of the HDLC frame at step 455, and further followed by receiving the remaining bytes of the HDLC frame, one byte at a time.

The instruction hierarchy of the present invention is also important, since it endeavors to maximize the number of operations that can be performed. In general, the transitions from task to task will be handled by the lowest level subtask possible, so the upper level subtasks will know which lower level subtask needs to be executed because the prior lower level task will update a task vector to apprise the higher level task of the next required operation.

Figure 4:
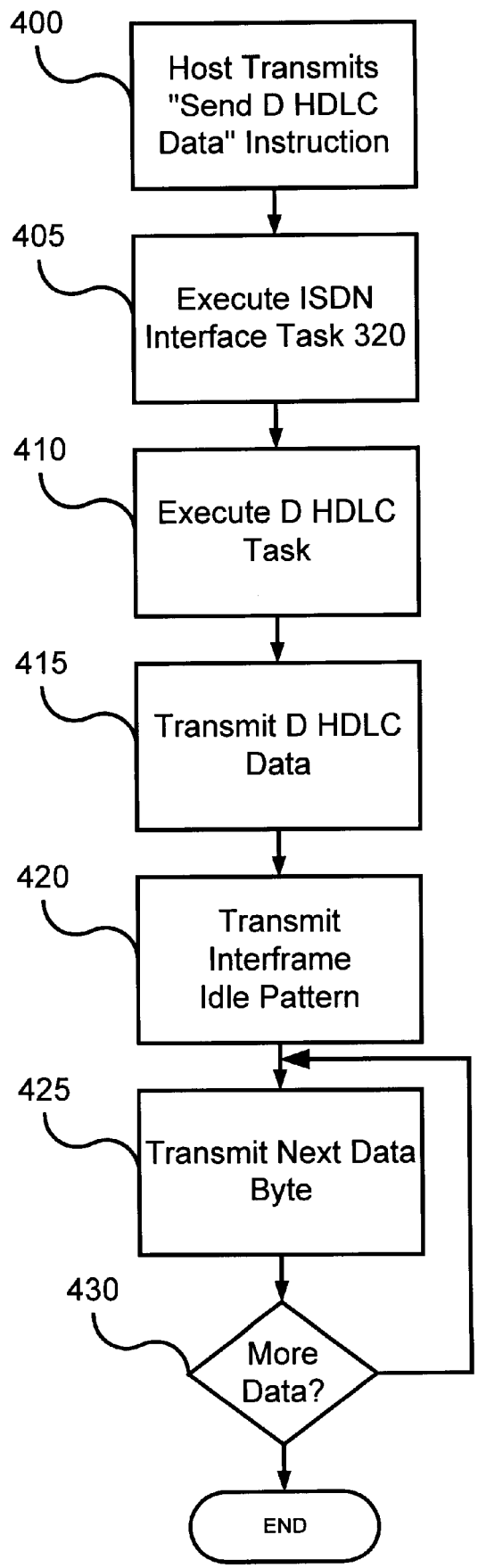
FIG. 4 shows in flow diagram form the execution of the D HDLC transmit operation of the present invention.

For example, in performing the operations of FIG. 4, above, the lower level subtask "transmit interframe idle pattern", or step 420 in FIG. 4, will execute its operation and then will inform the upper level subtask "D HDLC" to execute another subtask, "transmit the first byte of data," or step 425. The transmitting subtask 425 will then inform the D HDLC subtask to initiate the subsequent sub-task, and so on. In this manner, efficiency of execution is maintained and throughput is increased.

It will be appreciated by those skilled in the art that the present invention provides a low cost, high reliability, high performance solution to providing ISDN terminal connections. At the same time, the present invention maintains substantial flexibility to permit future modifications and enhancements.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

What is claimed is:

1. A terminal adapter for interconnection between a source of ISDN information and a host system, comprising:

an ISDN interface connected to the source of the ISDN information; and a digital signal processor connected to the ISDN interface and configured to perform all data handling steps for receiving information from the source of ISDN information and supplying selected information to the host system, the data handling steps including:

polling an ISDN interface of the terminal adapter and performing an ISDN task if the polling step shows that such an ISDN task exists;

polling a codec interface of the terminal adapter and performing a codec task if the polling step shows that such a codec task exists; and after both of the polling steps, executing a low priority task scheduler to execute exactly one low priority task.

2. The terminal adapter of claim 1 further including a codec for providing communication to and from a conventional telephone.

3. The terminal adapter of claim 1, wherein the step of polling the ISDN interface occurs before the step of polling the codec interface.

4. The terminal adapter of claim 1, wherein the ISDN task and the codec task are high level tasks performed in a loop.

5. The terminal adapter of claim 1, wherein the step of performing the codec task includes the step of performing a codec subtask which returns control to the codec task, which is at a higher level.

6. The terminal adapter of claim 5, wherein the step of performing the codec subtask includes apprising the codec subtask of another codec subtask to be initiated.

7. The terminal adapter of claim 5, wherein the step of performing a codec subtask includes the step of performing a codec sub-subtask and a call to a next codec subtask, which is at a higher level and which in turn executes another codec sub-subtask.

8. The terminal adapter of claim 1, wherein the step of performing the ISDN task includes the step of performing an ISDN subtask which returns control to the ISDN task, which is at a higher level.

9. The terminal adapter of claim 8, wherein the step performing the ISDN subtask includes apprising the ISDN subtask of another ISDN subtask to be initiated.

10. The terminal adapter of claim 8, wherein the step of performing an ISDN subtask includes the step of performing an ISDN sub-subtask and a call to a next ISDN subtask, which is at a higher level and which in turn executes another ISDN sub-subtask.

11. The terminal adapter of claim 8, wherein the ISDN subtask is a "D HDLC subtask", and wherein the step of performing the ISDN subtask includes the step of performing an "transmit the interframe idle pattern" sub-subtask, which returns control to the ISDN D HDLC subtask and which apprises the ISDN D HDLC subtask to call another ISDN "transmit the first byte of data" sub-subtask.

12. The terminal adapter of claim 11, further including the steps of returning control by the ISDN "transmit the first byte of data" sub-subtask to the ISDN D HDLC subtask and apprising the ISDN D HDLC subtask to call a subsequent ISDN sub-subtask.

13. A terminal adapter for interconnection between a source of ISDN information and a host system, comprising:

four integrated circuits, consisting of:

an ISDN interface connected the source of the ISDN information;

a codec for providing communication to and from a conventional telephone;

a subscriber loop interface, coupled to the codec; and a digital signal processor, connected to the ISDN interface and to the codec and configured to perform substantially all data handling steps for receiving information from the source of ISDN information and supplying selected information to the host system, the data handling steps including:

polling an ISDN interface of the terminal adapter and performing an ISDN task if the polling step shows that such an ISDN task exists;

polling a codec interface of the terminal adapter and performing a codec task if the polling step shows that such a codec task exists; and after both of the polling steps executing a low priority task scheduler to execute exactly one low priority task.

* * * * *